United States Patent
Oyama

(10) Patent No.: US 7,460,888 B2
(45) Date of Patent: Dec. 2, 2008

(54) MOBILE TERMINAL DEVICE PROTECTED AGAINST IMPACT

(75) Inventor: Koichi Oyama, Tokyo (JP)

(73) Assignee: NEC Corporation, Tokyo (JP)

( * ) Notice: Subject to any disclaimer, the term of this patent is extended or adjusted under 35 U.S.C. 154(b) by 345 days.

(21) Appl. No.: 10/990,681

(22) Filed: Nov. 18, 2004

(65) Prior Publication Data
US 2005/0107143 A1    May 19, 2005

(30) Foreign Application Priority Data
Nov. 19, 2003   (JP)   ............................. 2003-388685

(51) Int. Cl.
*H04B 1/38* (2006.01)

(52) U.S. Cl. ................ 455/566; 455/575.3; 455/575.8; 349/58; 349/60; 349/65; 349/155; 349/190; 361/824

(58) Field of Classification Search .................. 349/58, 349/158, 56, 60, 65, 126, 153, 154, 155, 349/156, 190; 455/575.3, 566, 575.8; 362/632; 345/905
See application file for complete search history.

(56) References Cited

U.S. PATENT DOCUMENTS

| | | | |
|---|---|---|---|
| 5,002,368 A | | 3/1991 | Anglin |
| 5,838,401 A | | 11/1998 | Uehara |
| 6,175,396 B1 | * | 1/2001 | Kim et al. ..................... 349/58 |
| 6,307,603 B1 | | 10/2001 | Menard et al. |
| 6,356,543 B2 | * | 3/2002 | Hall et al. .................... 370/352 |
| 6,382,419 B1 | * | 5/2002 | Fujimori et al. ............. 206/454 |
| 6,724,445 B2 | * | 4/2004 | Natsuyama ................... 349/58 |
| 6,731,354 B2 | * | 5/2004 | Menard ........................ 349/58 |
| 6,929,392 B2 | * | 8/2005 | Kim et al. .................... 362/632 |
| 7,046,328 B2 | * | 5/2006 | Jacobsen et al. ............. 349/158 |
| 7,092,702 B2 | * | 8/2006 | Cronin et al. ............... 455/418 |
| 7,121,710 B2 | * | 10/2006 | Kim et al. ................... 362/632 |
| 7,184,110 B2 | * | 2/2007 | Kim et al. ..................... 349/58 |
| 7,202,921 B2 | * | 4/2007 | Chen ............................. 349/65 |
| 7,224,416 B2 | * | 5/2007 | Cha et al. ..................... 349/60 |
| 7,244,966 B2 | * | 7/2007 | Fukayama .................... 257/98 |
| 2002/0042252 A1 | | 4/2002 | Toyoda et al. |
| 2003/0164918 A1 | | 9/2003 | Kela et al. |
| 2004/0025500 A1 | * | 2/2004 | Bardon et al. ................. 60/311 |

FOREIGN PATENT DOCUMENTS

| | | |
|---|---|---|
| EP | 0730185 A2 | 4/1996 |
| EP | 1 096 758 | 5/2001 |
| JP | 57-106268 | 7/1982 |
| JP | 04073714 A  * | 3/1992 |
| JP | 2000-122037 | 4/2000 |
| JP | 2001-127448 | 5/2001 |
| JP | 2001-175608 | 6/2001 |
| JP | 2001-264732 | 9/2001 |
| JP | 2001-272660 | 10/2001 |
| JP | 2002-051132 | 2/2002 |
| JP | 2002-051369 | 2/2002 |
| JP | 2002-278467 | 9/2002 |

* cited by examiner

*Primary Examiner*—Edward Urban
*Assistant Examiner*—Junpeng Chen
(74) *Attorney, Agent, or Firm*—Foley & Lardner LLP

(57) ABSTRACT

A display element, a holder and a substrate are stacked and housed in between a front case and a back case of a receiving section of a mobile terminal device. The front case has a rib, and the rib has a plurality of recesses shaped near four cases of the housed display element to reduce the rigidity against an impact.

20 Claims, 7 Drawing Sheets

MOBILE TERMINAL DEVICE PROTECTED AGAINST IMPACT

BACKGROUND OF THE INVENTION

1. Field of the Invention

The present invention relates to a mobile terminal device. In particular, it relates to a mobile terminal device that has a display element protected against a great impact occurring when the device is accidentally dropped, for example.

2. Description of the Related Art

Mobile terminal devices used for telephone conversation or transmission of various kinds of information, such as mobile phones, personal handy-phone systems (PHSs) and personal digital assistants (PDAs), have been developed and widely used.

Such mobile terminal devices have a display unit, such as a liquid crystal display (LCD), serving as a man/machine interface for displaying information being transmitted. To address the increasing amount of information transmitted, the display screen of the display unit is becoming larger and larger, enabling effective display of vast amounts of textual or graphical information (including photographs) acquired from a network, such as the Internet, or a host computer.

As a conventional technique, there has been disclosed an electronic device with a liquid crystal display whose frame, into which the display window of the liquid crystal display unit is fitted, and is designed having various thicknesses to reduce breakage of the display unit even if the housing is bent by an external impact or pressing force (for example, see Japanese Patent laid-open Publication No. 122037/2000, p.3, FIGS. 1 and 2). Besides, there have been disclosed a portable information terminal device, a support structure for a flat panel display and an electronic device that have an internal shock absorbing mechanism to prevent breakage of the device subjected to a shock (for example, see Japanese Patent laid-open Publication No. 175608/2001, p.2-3, FIGS. 1 and 2, and Japanese Patent laid-open Publication No. 278467/2002, p.4, FIG. 1). In addition, there have been disclosed a holder structure for a liquid crystal display element that improves the protection level of the liquid crystal display element mounted on an electronic device, such as a mobile phone, and the electronic device having the holder structure (for example, see Japanese Patent laid-open Publication No. 272660/2001, p.3-4, FIG. 1). Furthermore, there is disclosed a folding mobile phone that can be folded not to expose the metallic part to the outside (for example, see Japanese Patent laid-open Publication No. 51132/2002, p.3, FIG. 1).

As disclosed in the publications described above, some mobile terminal devices, such as mobile phones, are of a folding type. For example, conventional mobile phone 20 shown in FIG. 1 has receiving section 21 and transmitting section 22 connected to each other by hinge section H. Receiving section 21 has display section 23, such as a liquid crystal display panel, and transmitting section 22 has a plurality of key switches 24.

For example, as shown in the cross-sectional view of FIG. 2, receiving section 21 of mobile phone 20 typically comprises front case 25, display element 26, holder 27, substrate 28 and back case 29. Holder 27 is attached to substrate 28 and holds display element 26, such as a liquid crystal display panel, on the front side of mobile phone 20 (that is, on the opposite side of substrate 28). Front case 25 serves to protect display element 26, and at least a part thereof corresponding to the display area of display element 26 is made of a transparent material to allow a user to see the characters or graphics on the display area.

In the case of mobile phone 20 configured as described above, for example, if the user accidentally drops it onto ground G or the like during telephone conversation, the impact causes display element 26 to bend as shown in FIG. 2. If the deformation by the bending exceeds a certain limit, display element 26 may break.

To avoid such breakage of display element 26, the Japanese Patent laid-open Publication No. 272660/2001 described above discloses an arrangement shown in FIG. 3. Specifically, holder 27 for fixedly holding display element 26 has a plurality of (two, for example) pins 30A and 30B on the back side thereof, and pins 30A and 30B are fitted into holes 31A and 31B formed in substrate 28. Holder 27, which has a substantially rectangular shape, has side walls 32A and 32B that extend along the periphery of display element 26 when holder 27 holds display element 26. Pins 30A and 30B described above are disposed at corners where side faces 33A to 33C of side walls 32A and 32B intersect with the bottom of holder 27 on which display element 26 is mounted. Display element 26 on the holder 27 is connected to a driving section (driver) on substrate 28 via flexible substrates 26A and 26B or the like.

However, the conventional technique described above has some problems. First, it is difficult to increase the display area. This is because the display element is inadequately protected. According to the conventional protective measure, the display element is protected by pins provided at the highly rigid peripheral part of the holder. However, if the display element is subjected to a great impact when the folding portable terminal is dropped, for example, the portable terminal is deformed as shown in FIG. 2. The conventional technique, which takes no protective measure at the middle part of the holder, does not provide against increased bending of the display element due to increase of the display area, and thus, the display element may break.

Second, it is difficult to reduce the thickness of the mobile terminal device. This is because the display element is inadequately protected. As with the case described above, according to the conventional technique, which takes no protective measure at the middle part of the holder, as the rigidity of the whole device decreases as the thickness of the device is reduced, it needs to increase the thickness of the holder to prevent an increase of bending of the display element.

SUMMARY OF THE INVENTION

The present invention has been devised in view of the problems with the conventional techniques described above, and an object of the present invention is to provide a mobile terminal device that overcomes or eases the problems.

To attain the object, mobile terminal devices according to the present invention have the following characteristics.

Specifically, a mobile terminal device according to the present invention comprises a transmitting section and a receiving section, the receiving section has a front case and a back case, and a display element, a holder and a substrate are housed in between the front case and the back case. The front case of the receiving section has a rib that is larger than the circumference of the display element and has a plurality of recesses. The mobile terminal device according to the present invention thus configured is adequately bent at the recesses, so that the rigidity against an impact is reduced, and any great internal stress does not occur in the display element in the receiving section. Therefore, bending of display element itself is largely reduced, and in particular, the display element can be protected against a great impact occurring when the mobile terminal device is accidentally dropped, for example.

The mobile terminal device according to the present invention described above has a remarkable practical advantage. That is, the display screen can be upsized, which is necessary for mobile terminal devices that transmit or receive a vast amount of data through the Internet or transmit or receive photographs taken with the built-in charge coupled device (CCD) camera. In addition, the mobile terminal device according to the present invention can be reduced in thickness, which contributes to weight reduction or the like, which is necessary for portable electronic devises.

In addition, in the mobile terminal device according to the present invention, at least some of the plurality of recesses may be shaped near corners of the display element.

In addition, in the mobile terminal device according to the present invention, four recesses may be shaped near four corners of the display element.

In addition, in the mobile terminal device according to the present invention, the transmitting section and the receiving section may be capable of rotating about a hinge.

A mobile terminal device according to the present invention has a display element mounted thereon and a case that houses the display element and has a plurality of recesses along the circumference thereof.

In addition, in the mobile terminal device according to the present invention, the plurality of recesses may be shaped at four corners of the case.

In addition, in the mobile terminal device according to the present invention, the case may be rotatably connected to another case by a hinge.

The above and other objects, features, and advantages of the present invention will become apparent from the following description with reference to the accompanying drawings, which illustrate examples of the present invention.

DETAILED DESCRIPTION OF THE PREFERRED EMBODIMENT

Figure 1:
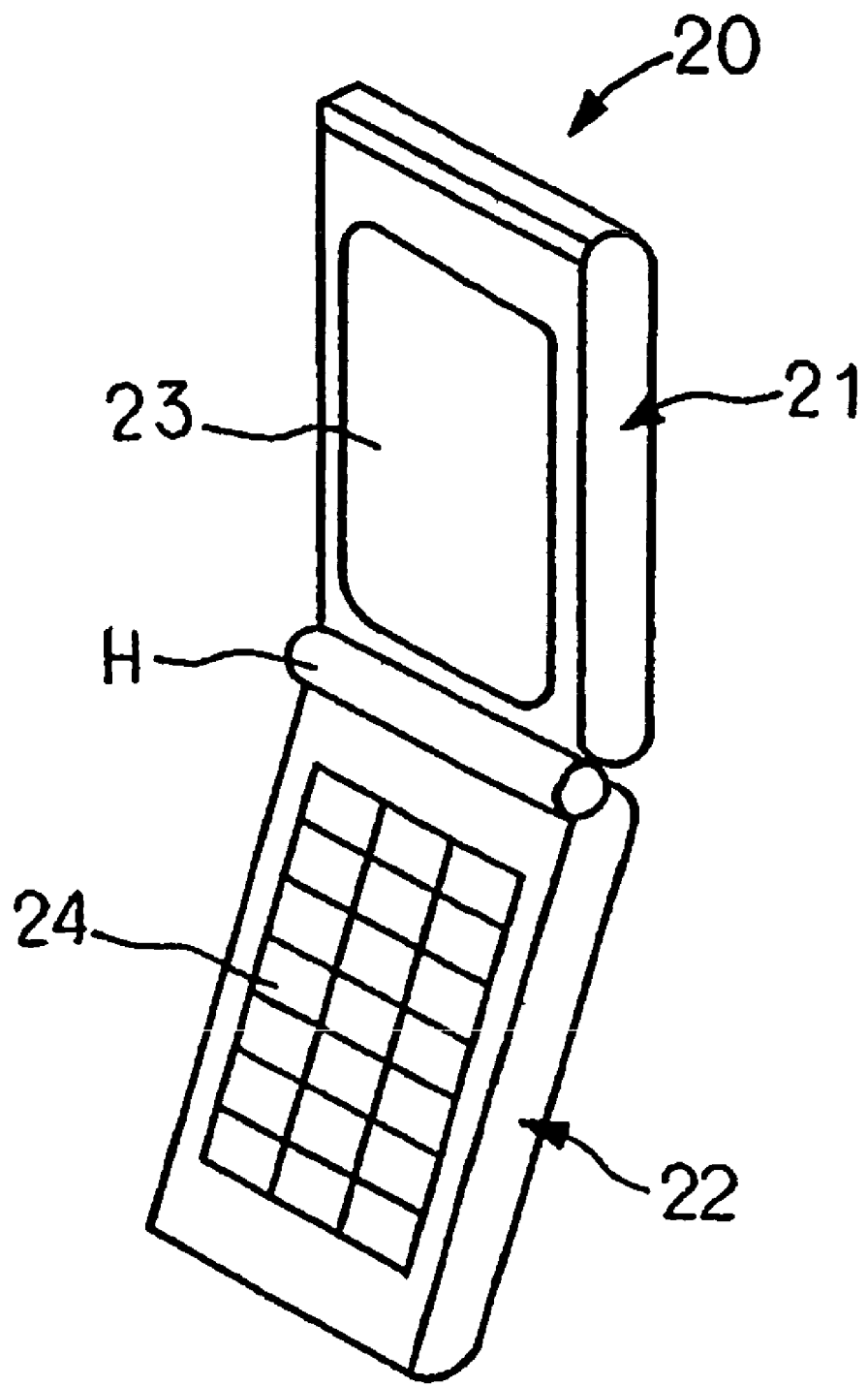
FIG. 1 is a perspective view of a conventional mobile phone in a usable state.
Figure 2:
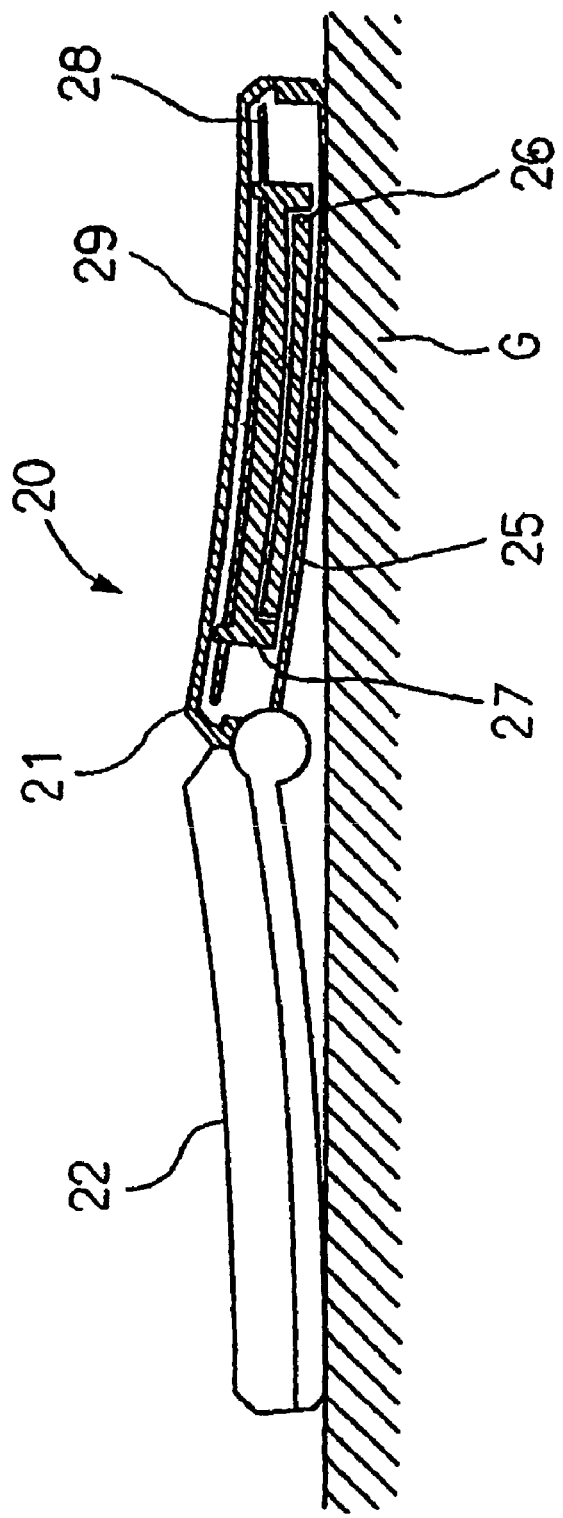
FIG. 2 is a partial cross-sectional view of the mobile phone shown in FIG. 1 dropped onto a ground.
Figure 3:
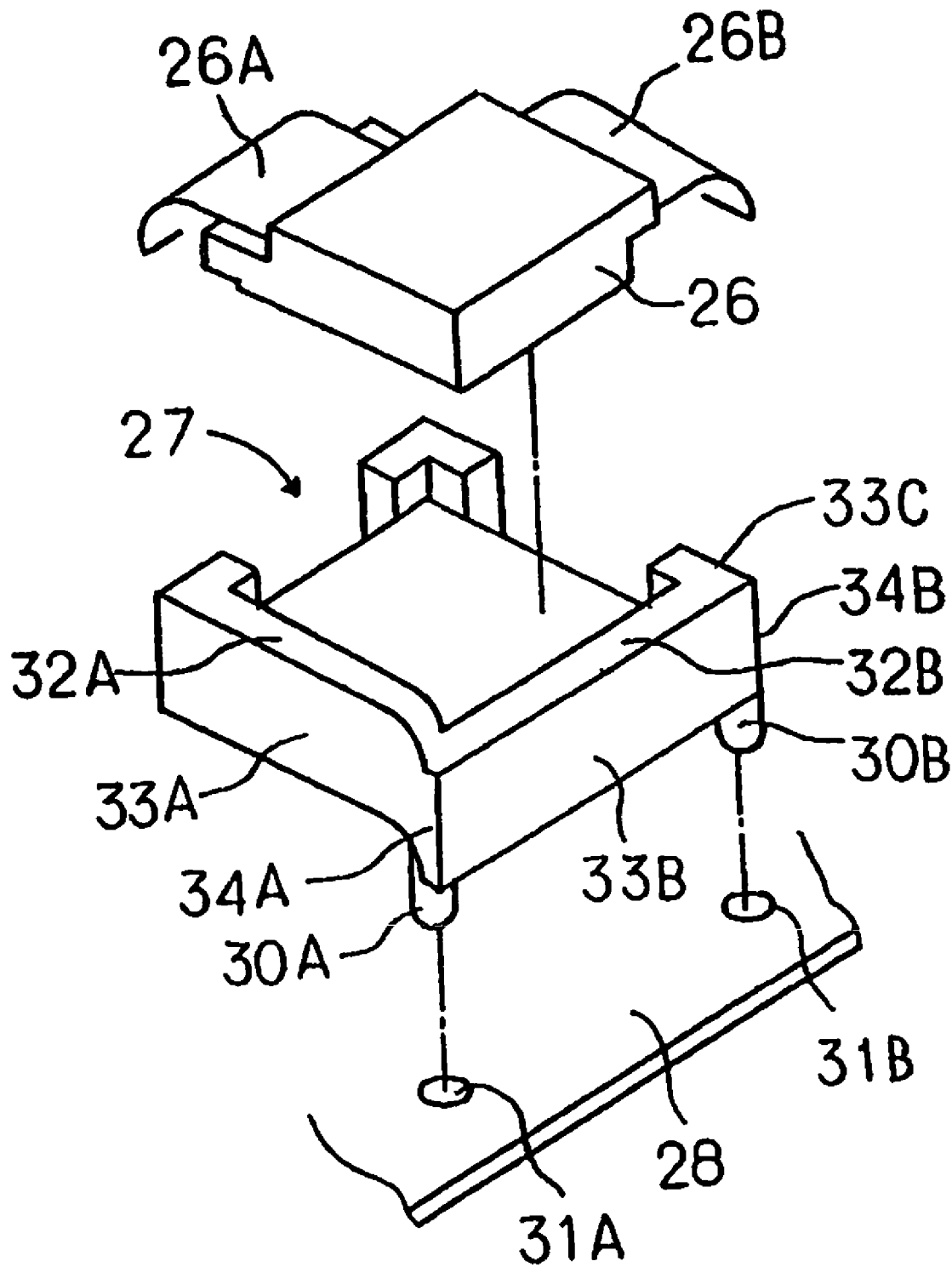
FIG. 3 is an exploded perspective view of a display element and a holder of the mobile phone shown in FIG. 1.
Figure 4:
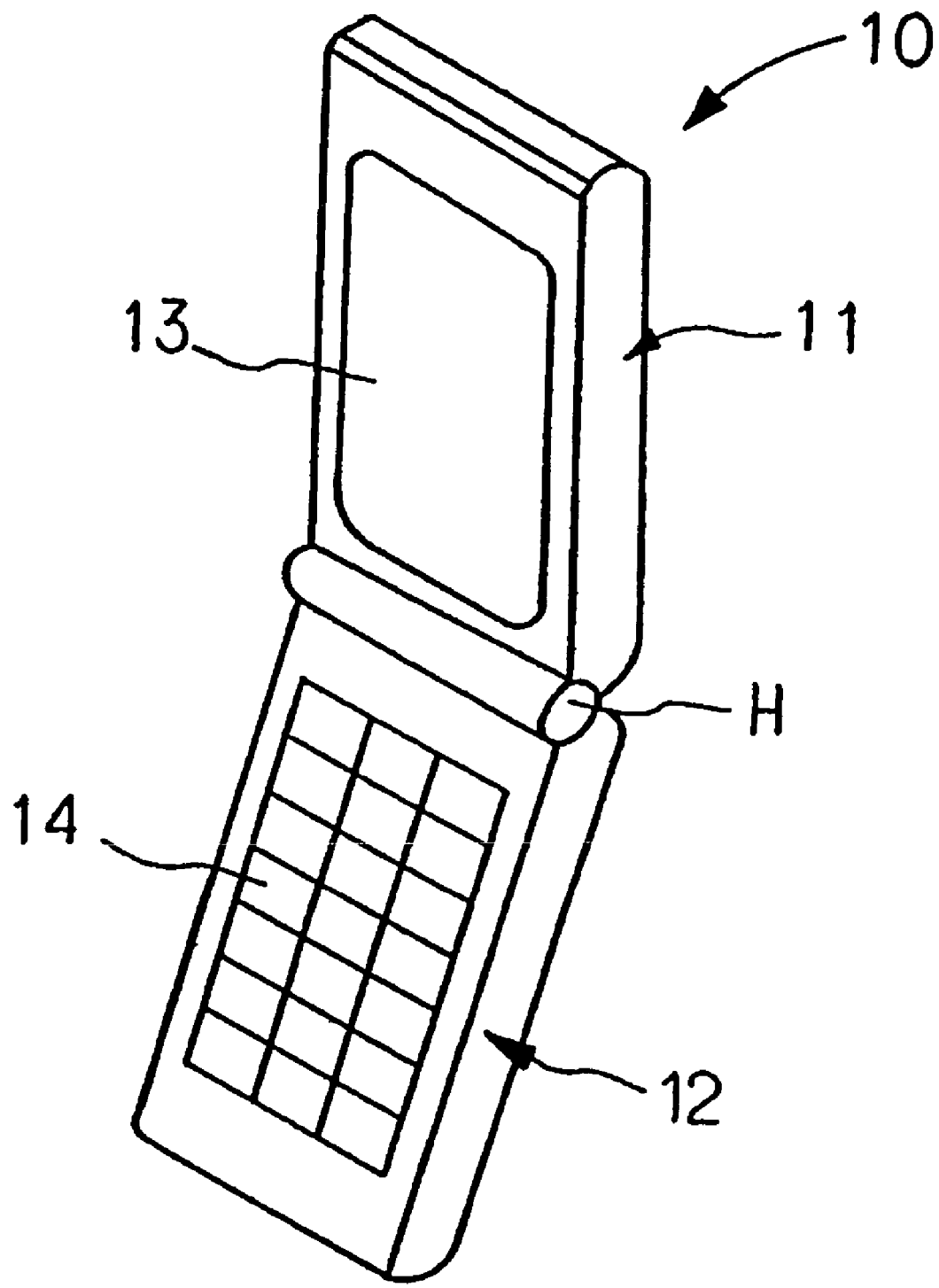
FIG. 4 is a perspective view of a folding mobile phone as viewed from the outside in a usable state, which is a preferred embodiment of a mobile terminal device according to the present invention.

First, FIG. 4 is a perspective view of a mobile phone as viewed from the outside, which is a preferred embodiment of a mobile terminal device according to the present invention. Mobile phone 10 comprises receiving section 11 and transmitting section 12 that are rotatably connected to each other by hinge H. Receiving section 11 has relatively large display unit 13, such as a liquid crystal display panel. On the other hand, transmitting section 12 has key switches 14. Therefore, viewed from the outside, mobile phone 10 is substantially the same as conventional mobile phone 10 shown in FIG. 1.

Figure 5:
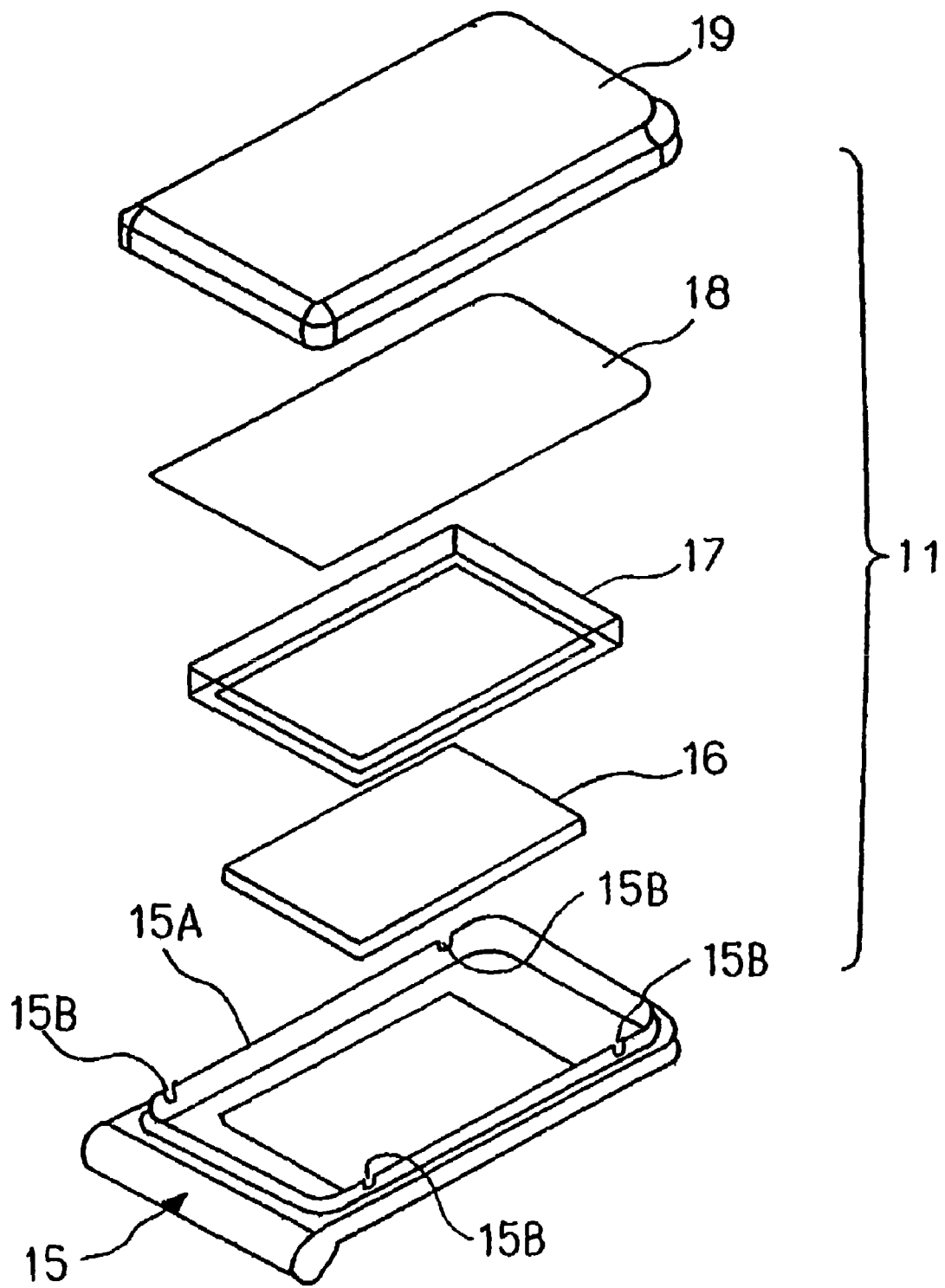
FIG. 5 is an exploded perspective view of a receiving section of the mobile phone shown in FIG. 4, showing details of the internal configuration thereof.

Next, FIG. 5 is an exploded perspective view of receiving section 11 of mobile phone 10 according to the present invention, showing details of the internal configuration thereof. As shown in FIG. 5, receiving section 11 of mobile phone 10 according to the present invention comprises display element 16, holder 17, substrate 18, front case 15 and back case 19. In the assembled state, display element 16, holder 17 and substrate 18 are housed in between front case 15 and back case 19 that are put together. As well known, receiving section 11 has an extensible antenna (not shown) and a speaker (not shown), and transmitting section 12 has a microphone (not shown).

In FIG. 5, display element 16 is disposed on front case 15 of receiving section 11 of mobile phone 10. Holder 17 is configured to cover the four side walls and the back surface of display element 16. Substrate 18 is mounted on holder 17. In addition, back case 19 of receiving section 11 is disposed on substrate 18. Front case 15 of receiving section 11 has seamless rib 15A on the periphery thereof. A plurality of recesses (notches) 15B are shaped in rib 15A. Preferably, four recesses 15B are shaped near the four corners of display element 16, for example. Recesses 15B may have any shape that reduces the rigidity of rib 15 as required when an impact occurs and may be U-shaped or V-shaped, for example.

Figure 6:
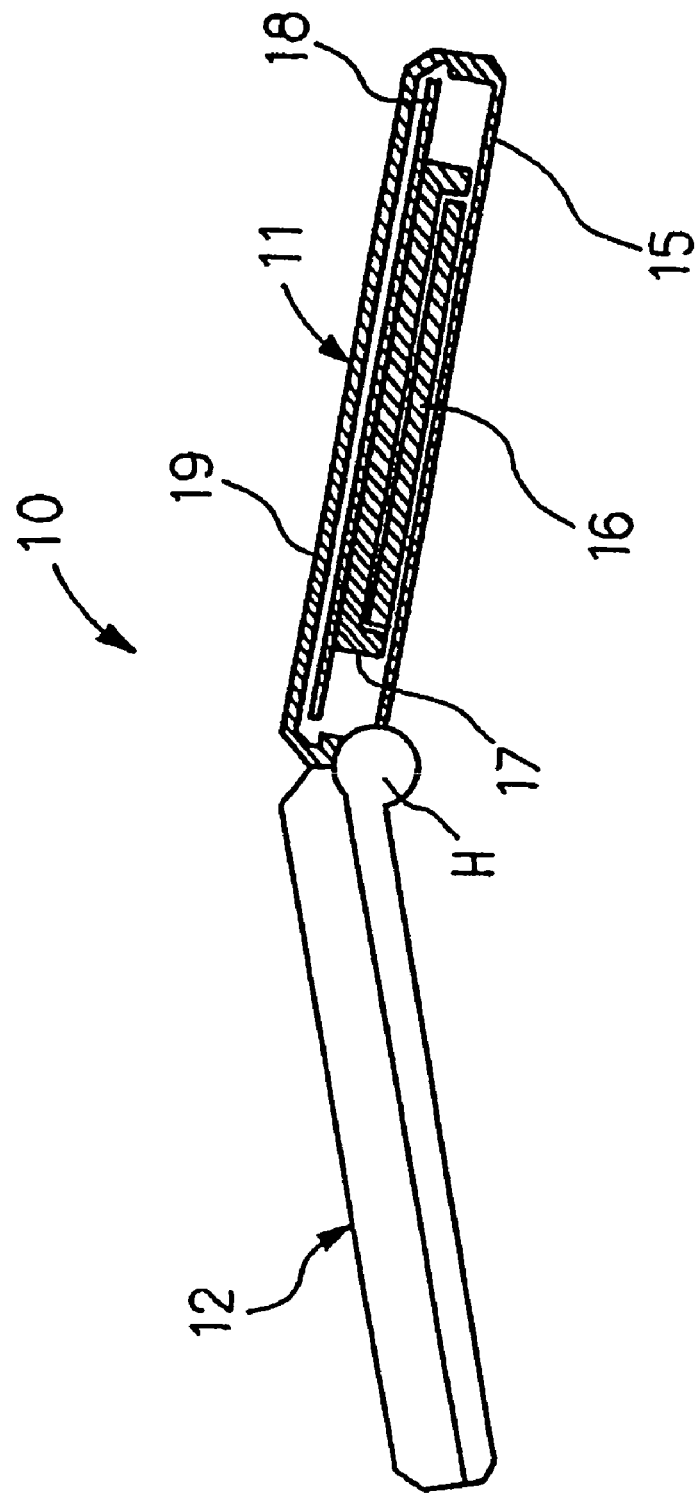
FIG. 6 is a partial cross-sectional view of the mobile phone shown in FIG. 4 in a usable state.
Figure 7:
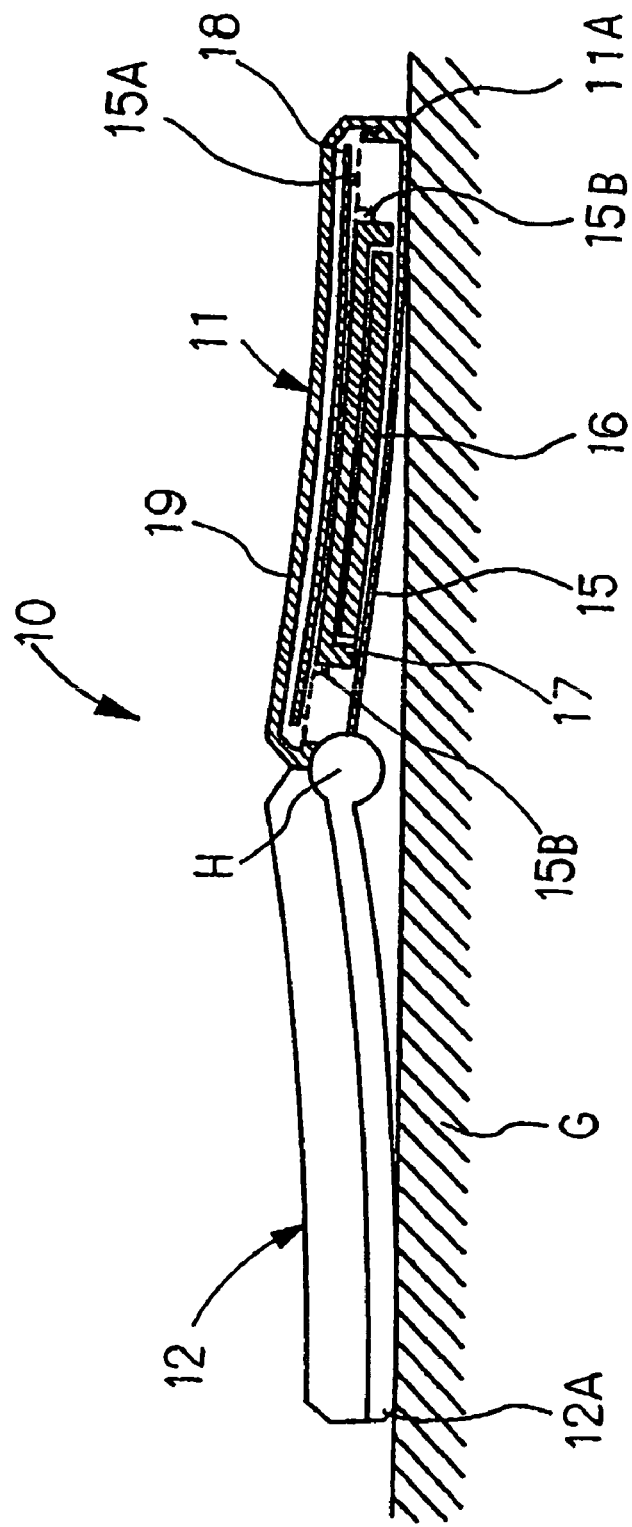
FIG. 7 is a partial cross-sectional view of the mobile phone shown in FIG. 6 dropped onto a ground.

Next, with reference to FIGS. 6 and 7, there will be described behavior when a user drops mobile phone 10 configured as shown in FIGS. 4 and 5 onto ground G (or a hard floor) and mobile phone 10 is subjected to a great impact. FIG. 6 is a partial cross-sectional view of mobile phone 10 in a normal usable state. FIG. 7 is a partial cross-sectional view of mobile phone 10 dropped onto ground G and subjected to an impact.

As shown in FIG. 6, to be in the normal usable state, mobile phone 10 is opened by rotating receiving section 11 and transmitting section 12 mutually about hinge H. Then, the user enters the telephone number of a person he/she wants to talk with or communicate with by manipulating key switches 14 on transmitting section 12. Then, once a wireless communication link with a base station (not shown) is established via the antenna described above, the user speaks into the microphone on transmitting section 12 and hears the voice of the person on the other end of the link via the speaker on receiving section 11. Alternatively, in the case of communication via the Internet or the like, the textual or graphical data or information received is displayed on display element 16. Here, if the user enters a number or the like by manipulating key switches 14, display element 16 displays the entered number or the like so that the user can confirm the entry. In addition, when mobile phone 10 is not used (or is put away), receiving section 11 and transmitting section 12 are rotated about hinge H to be folded, thereby making mobile phone 10 compact and protecting the display area of display unit 13.

As shown in FIG. 7, when the user accidentally drops mobile phone in the normal usable state shown in FIG. 6 onto ground G, tip end 11A of receiving section 11 and tip end 12A of transmitting section 12 first come into contact with ground G. Therefore, mobile phone 10 having collided with ground G is bent in the direction of gravitational force, supported at tip end 11A of receiving section 11 and tip end 12A of transmitting section 12.

Front case 15 of receiving section 11 in which display element 16 is disposed has an extremely reduced rigidity (that is, an extremely increased flexibility) at the plurality of recesses 15B shaped in rib 15A surrounding front case 15 of receiving section 11. Therefore, when mobile phone 10 is dropped and subjected to an impact, a great internal stress occurs at recesses 15B shaped in rib 15A surrounding front case 15 of receiving section 11. Thus, mobile phone 10 is adequately bent at recesses 15B as shown in FIG. 7. Thus, any great internal stress does not occur in display element 16 in receiving section 11, so that bending of display element 16 itself is largely reduced.

The particular configuration described above effectively suppresses bending of holder 17 and display element 16 of receiving section 11 of mobile phone 10 according to the present invention when mobile phone 10 is dropped and subjected to an external impact, and thus, it is possible to prevent breakage or the like of display element 16.

While preferred embodiments of the present invention have been described using specific terms, such description is for illustrative purposes only, and it is to be understood that changes and variations may be made without departing from the spirit or scope of the following claims.

What is claimed is:

1. A mobile terminal device comprising:
   a transmitting section; and
   a receiving section,
   wherein the receiving section has a front case and a back case that are put together, and a display element, a holder, and a substrate which are housed in between the front case and the back case, the front case of said receiving section having a rib larger than a circumference of said display element, the rib having a plurality of recesses to reduce a rigidity against an impact, said holder for covering the circumference of the display element such that the holder is in between the display element and the rib;
   wherein the rib extends from a portion of the front case;
   wherein a portion of the rib extends between a bottom of a first recess of the plurality of recesses and the portion of the front case;
   wherein the first recess provides an opening in the rib from an outer circumference of the rib to an inner circumference of the rib; and
   wherein the display element is held apart from the rib.

2. The mobile terminal device according to claim 1, wherein at least some of said plurality of recesses are shaped near corners of said display element.

3. The mobile terminal device according to claim 1, wherein four recesses are shaped near four corners of said display element.

4. The mobile terminal device according to claim 1, wherein said transmitting section and said receiving section are capable of mutually rotating about a hinge.

5. The mobile terminal device of claim 1,
   wherein the rib protrudes from a surface of the front case in a direction toward the back case; and
   wherein the plurality of recesses extend only partially into the rib from an outer edge of the rib toward the surface of the front case.

6. The mobile terminal device of claim 1,
   wherein the rib has a plurality of sides; and
   wherein each recess of the plurality of recesses is provided on only one corresponding side of the plurality of sides.

7. The mobile terminal device of claim 1,
   wherein the first recess extends from an edge of the rib that is closest to the back case toward the front case.

8. The mobile terminal device of claim 1,
   wherein at least a portion of the front case comprises a transparent material to allow a display area of the display element to be viewed; and
   wherein the display area of the display element is visible to a user.

9. The mobile terminal device of claim 1,
   wherein the first recess is U-shaped.

10. The mobile terminal device of claim 1,
    wherein the first recess is V-shaped.

11. The mobile terminal device of claim 1,
    wherein the rib extends a given height from the portion of the front case; and
    wherein a depth of each recess of the plurality of recesses is less than the given height.

12. The mobile terminal device of claim 1,
    wherein the first recess defines a completely empty space containing no additional elements.

13. The mobile terminal device of claim 1,
    wherein the rib has a substantially rectangular shape with a pair of longer sides and a pair of shorter sides; and
    wherein the plurality of recesses are along the pair of longer sides of the rib.

14. The mobile terminal device of claim 1,
    wherein the outer circumference of the rib is smaller than an outer circumference of the front case.

15. A mobile terminal device, comprising:
    a display element;
    a case that houses said display element, said case comprising a rib that at least substantially surrounds a circumference of the display element, said rib having a plurality of recesses that extend from an edge of the rib; and
    a holder for covering the circumference of the display element such that the holder is in between the display element and the rib;
    wherein the rib extends from a portion of the case;
    wherein a portion of the rib extends between a bottom of a first recess of the plurality of recesses and the portion of the case;
    wherein the first recess provides an opening in the rib from an outer circumference of the rib to an inner circumference of the rib; and
    wherein the display element is held apart from the rib.

16. The mobile terminal device according to claim 15, wherein said plurality of recesses are shaped at four corners of said case.

17. The mobile terminal device according to claim 15, wherein said case is mutually rotatably connected to another case by a hinge.

18. The mobile terminal device of claim 15,
    wherein the rib has plurality of sides; and
    wherein each recess of the plurality of recesses is provided on only one corresponding side of the plurality of sides.

19. The mobile terminal device of claim 15,
    wherein the edge is an outer edge of the rib that is not directly in contact with the display element.

20. The mobile terminal device of claim 15,
    wherein at least a portion of the case comprises a transparent material to allow a user to view a display area of the display element.

* * * * *